United States Patent
Ellis et al.

(10) Patent No.: US 9,122,646 B2
(45) Date of Patent: Sep. 1, 2015

(54) GRAPHICS PROCESSING SYSTEMS

(71) Applicant: ARM Limited, Cambridge (GB)

(72) Inventors: Sean Ellis, Farnham (GB); Andreas Engh-halstvedt, Trondheim (NO); Jorn Nystad, Trondheim (NO)

(73) Assignee: ARM LIMITED, Cambridge (GB)

( * ) Notice: Subject to any disclaimer, the term of this patent is extended or adjusted under 35 U.S.C. 154(b) by 330 days.

(21) Appl. No.: 13/623,744

(22) Filed: Sep. 20, 2012

(65) Prior Publication Data

US 2013/0076761 A1 Mar. 28, 2013

(30) Foreign Application Priority Data

Sep. 22, 2011 (GB) .................................. 1116437.3

(51) Int. Cl.
*G06T 1/20* (2006.01)
*G06T 11/40* (2006.01)
*G06F 15/16* (2006.01)
*G06F 9/50* (2006.01)

(52) U.S. Cl.
CPC .............. *G06F 15/16* (2013.01); *G06F 9/5083* (2013.01); *G06T 1/20* (2013.01); *G06T 11/40* (2013.01)

(58) Field of Classification Search
None
See application file for complete search history.

(56) References Cited

U.S. PATENT DOCUMENTS

| 5,008,838 | A | 4/1991 | Kelleher |
| 5,729,672 | A | 3/1998 | Ashton |
| 5,794,016 | A * | 8/1998 | Kelleher ........................ 345/505 |
| 6,313,841 | B1 | 11/2001 | Ogata |
| 7,817,153 | B2 * | 10/2010 | Bando et al. ................... 345/501 |
| 2004/0125111 | A1 * | 7/2004 | Tang-Petersen et al. ...... 345/506 |
| 2007/0132772 | A1 * | 6/2007 | Morphet ........................ 345/553 |
| 2007/0146378 | A1 * | 6/2007 | Sorgard et al. ................. 345/581 |

(Continued)

FOREIGN PATENT DOCUMENTS

| EP | 1125250 | 1/2004 |
| EP | 2161685 | 3/2010 |

(Continued)

OTHER PUBLICATIONS

Fuchs, et al., "Pixel-Planes 5: A Heterogeneous Multiprocessor Graphics System Using Processor-Enhanced Memories," SIGGRAPH '89 Proceedings of the 16th annual conference on Computer graphics and interactive techniques, Jul. 1989.*

(Continued)

*Primary Examiner* — Maurice L McDowell, Jr.
*Assistant Examiner* — Donna J Ricks
(74) *Attorney, Agent, or Firm* — Vierra Magen Marcus LLP

(57) ABSTRACT

In a tile-based graphics processing system having plural rendering processors, the set of tiles 31 to be processed to generate an output frame 30 for display is partitioned among the different rendering processors by defining respective tile traversal paths 32, 33, 34, 35 for each rendering processor that start at a tile initially allocated to the processor and that, at least for the initial tiles along the path, traverse to spatially adjacent tiles in the output, and that will traverse every tile to be rendered if followed to their end. The next tile for a given rendering processor to process is then selected as being the next tile along its defined path, unless the next tile in the path has already been processed (or is already being processed) by another rendering processor, in which case the next tile to be allocated to the rendering processor is selected to be a free tile further on in the tile traversal path for that processor.

22 Claims, 2 Drawing Sheets

(56) References Cited

U.S. PATENT DOCUMENTS

| | | | |
|---|---|---|---|
| 2009/0135180 A1* | 5/2009 | Li | 345/420 |
| 2012/0162250 A1* | 6/2012 | Glen | 345/629 |

FOREIGN PATENT DOCUMENTS

| | | | | |
|---|---|---|---|---|
| GB | 2226937 | | 7/1990 | |
| GB | WO2009/068893 | * | 6/2009 | G06T 15/00 |

OTHER PUBLICATIONS

Kawai, "Evaluation of Parallel Ray Tracing Algorithm Using Screen Space Subdivision for Image Generation System MAGG," Systems and Computers in Japan, vol. 15, No. 11, 1994.*

GB Search Report dated Jan. 20, 2012, GB Patent Application No. GB1116437.3.

Abraham, et al., "A load-balancing strategy for sort-first distributed rendering," Proceedings of the XVII Brazilian Symposium on Computer Graphics and Image Processing (SIBGRAPI'04), 2004.

Whitman, "A Task Adaptive Parallel Graphics Renderer," Parallel Rendering Symposium, Livermore, California, 1993.

Eldridge, et al., "Pomegranate: A Fully Scalable Graphics Architecture," Computer Graphics, 2000.

Whitman, "Dynamic Load Balancing for Parallel Polygon Rendering," David Sarnoff Research Center, Computer Graphics and Applications, IEEE, Jul. 1994.

Ellsworth, "A Multicomputer Polygon Rendering Algorithm for Interactive Applications," Parallel Rendering Symposium, Oct. 1993.

Kaplan, et al., "Parallel Processing Techniques for Hidden Surface Removal," SIGGRAPH '79 Proceedings of the 6th annual conference on Computer graphics and interactive techniques, Aug. 1979.

Coppen, et al., "A Distributed Frame Buffer for Rapid Dynamic Changes to 3D Scenes," Computer & Graphics, vol. 19, No. 2 pp. 247-250, 1995.

Olano, et al., "Triangle Scan Conversion using 2D Homogeneous Coordinates," HWWS '97 Proceedings of the ACM SIGGRAPH/EUROGRAPHICS workshop on Graphics hardware, pp. 89-95, 1997.

Cox, et al., "Architectural Implications of Hardware-Accelerated Bucket Rendering on the PC," HWWS '97 Proceedings of the ACM SIGGRAPH/EUROGRAPHICS workshop on Graphics hardware, pp. 25-34, 1997.

Whelan, "ANIMAC: A Multiprocessor Architecture for Real-Time Computer Animation," Thesis in partial fulfillment of the requirements for the degree of Doctor of Philosophy, California Institute of Technology, May 1985.

Ellsworth, "A New Algorithm for Interactive Graphics on Multicomputers," Computer Graphics and Applications, IEEE, Jul. 1994.

Roble, "A Load Balanced Parallel Scanline Z-buffer Algorithm for the iSPC Hypercube," Proceedings of the 1st International Conference, Pixim 88 Computer Graphics in Paris, Oct. 24-28, 1988.

Ellsworth, "Polygon Rendering for Interactive Visualization on Multicomputers," Dissertation in partial fulfillment of the requirements for the degree of Doctor of Philosophy, University of North Carolina, Chapel Hill, Department of Science 1996.

* cited by examiner

GRAPHICS PROCESSING SYSTEMS

This application claims priority to UK Patent Application No. 1116437.3 filed Sep. 22, 2011.

BACKGROUND

The technology described herein relates to graphics processing systems and in particular to tile-based graphics processing systems.

As is known in the art, in tile based rendering, the two dimensional output array or frame of the rendering process (the "render target") (e.g., and typically, that will be displayed to display the scene being rendered) is sub-divided or partitioned into a plurality of smaller sub-regions, usually referred to as "tiles", for the rendering process. The tiles (sub-regions) are each rendered separately (typically one after another). The rendered tiles (sub-regions) are then recombined to provide the complete output array (frame) (render target), e.g. for display.

The tiles can therefore be thought of as the sub divisions of the render target area (output frame) that the rendering process operates on. In such arrangements, the render target area (output frame) is typically divided into regularly sized and shaped tiles (they are usually, e.g., squares or rectangles) but this is not essential.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.

As is known in the art, in a tile-based graphics system, a list of drawing commands is usually built for each tile to be rendered (e.g. for each tile in the visible display area), based on which visible elements of the scene being rendered are visible in the tile in question. Then, when a tile is to be rendered, the list of drawing commands for that tile is allocated to the rendering processor for processing.

It is now known to provide tile-based graphics processing systems that include multiple independent tile rendering processors. This offers the opportunity to render plural tiles in parallel, thereby potentially reducing the time taken to render an output frame.

One issue with such multiple rendering processor arrangements is the question of how to allocate the different tiles to the different rendering processors for rendering (i.e. how to distribute the tiles among the rendering processors efficiently). A number of techniques have been proposed in the prior art for this.

For example, if it is assumed that there are n tiles on the screen, and m independent tile rendering processors, then a first known prior art strategy allocates a fixed set of n/m tiles to each processor. For example, with 2 processors, one might assign all tiles in the top half of the screen to processor 0, and all tiles in the bottom half of the screen to processor 1.

However, the Applicants have recognised that this is not optimal because there is no facility for load balancing. For example, if there is much more detail on the ground than in the sky, then processor 0 will stand idle waiting for processor 1 to catch up.

It is known to try to make such fixed allocation schemes more sophisticated. In this case a fixed set of tiles is allocated to each processor, but making a guess at the appropriate load balance, e.g. based on tile list complexity. For example, one might allocate the top ¾ of the tiles to processor 0 in the unbalanced example above, so that even though processor 0 has more tiles to process, the total time taken by each processor will be (it is hoped) approximately the same. However, this requires extra analysis of the tile lists, usage data from the previous frame, etc.

Another known allocation strategy is to order the tiles one after another, and then assign the next tile in the order to whichever processor becomes free first. This can balance the load between processors better.

However, the Applicants have recognised that this strategy will impair the exploitation of any potential spatial coherency between tiles (the Applicants have recognised that it is quite likely that adjacent tiles will share a lot of rendering state—textures used, material settings, etc.). This is because with this allocation strategy each processor will typically pick up a tile that is some distance away from its previous one as its next tile. (The exact number of tiles that will be "leapfrogged" here will be scene dependent, but will be usually be somewhere between $\sqrt{m}$ and m tiles ahead of the previous one (where m is the number of processors), so this gets worse the more processors there are).

Thus, the current mechanisms for allocating tiles (the command lists for tiles) to rendering processors in multi-processor tile-based graphics processing systems each suffer from one or more drawbacks.

The Applicants believe therefore that there remains scope for improved tile allocation strategies in multi-processor, tile-based, graphics processing systems.

BRIEF DESCRIPTION OF THE DRAWINGS

A number of embodiments of the technology described herein will now be described by way of example only and with reference to the accompanying drawings, in which.

DETAILED DESCRIPTION

Figure 1:
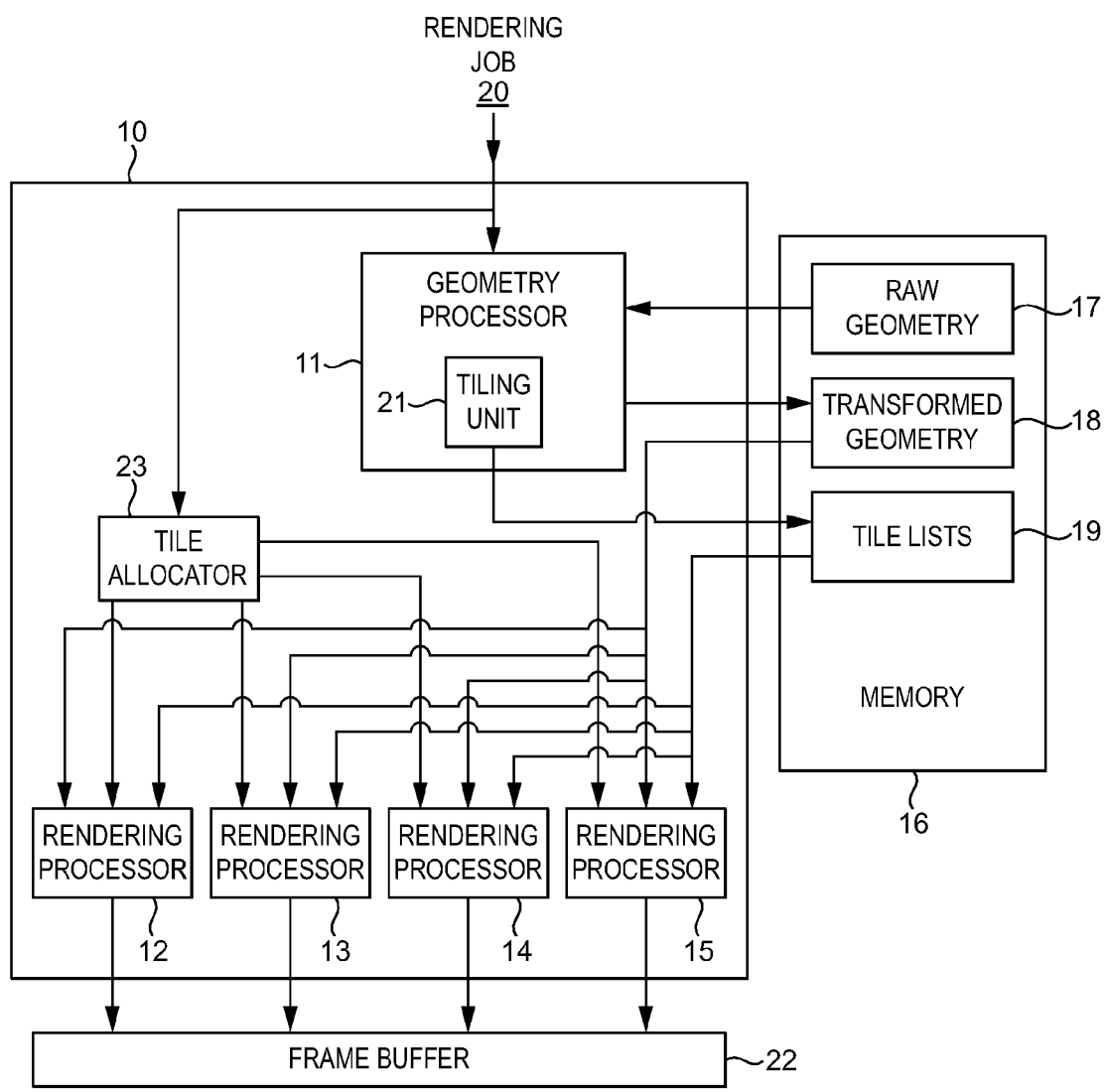
FIG. 1 shows schematically a graphics processing system that can operate in accordance with the technology described herein.

A first embodiment of the technology described herein comprises a method of rendering all or part of an output render target, such as an output frame comprising, a plurality of tiles in a tile-based graphics processing system that comprises plural rendering processors, the method comprising:

initially allocating a different tile of the plurality of tiles to be rendered to each rendering processor; and when each rendering processor completes the tile it is currently processing, allocating another tile that is still to be processed to that rendering processor, and so on, until all the tiles to be rendered have been allocated to rendering processors;

wherein the next tile to be allocated to a given rendering processor for processing is selected as being the next tile along a path defined for the given rendering processor that starts at the tile initially allocated to that given rendering processor and that will traverse every tile to be rendered if followed to its end, and which path is configured such that, at least for the initial tiles along the path, adjacent tiles in the path are spatially adjacent in the frame, unless the next tile in the path for the given processor has already been allocated to another rendering processor for processing, in which case the next tile to be allocated to the given rendering processor is selected to be a tile further on in the tile traversal path for that given processor that is still to be allocated to a rendering processor for processing.

A second embodiment of the technology described herein comprises a tile-based graphics processing system comprising:

a plurality of rendering processors; and a tile allocator for allocating tiles to be rendered to render all or part of an output render target, such as an output frame, to the plural rendering processors; wherein the tile allocator is configured to:

initially allocate a different tile of the tiles to be rendered to each rendering processor; and to, when a rendering processor completes the tile it is currently processing, allocate another tile that is still to be processed to that rendering processor, and so on, until all the tiles to be rendered have been allocated to rendering processors; and wherein the tile allocator is configured to:

select the next tile to be allocated to a given rendering processor for processing as being the next tile along a path defined for the given rendering processor that starts at the tile initially allocated to that given rendering processor and that will traverse every tile to be rendered if followed to its end, and which path is configured such that, at least for the initial tiles along the path, adjacent tiles in the path are spatially adjacent in the frame, unless the next tile in the path for the given processor has already been allocated to another rendering processor, in which case it selects a tile further on in the tile traversal path for the given processor that is still to be allocated to a rendering processor for processing as the next tile to be allocated to the given rendering processor.

The technology described herein relates to tile-based graphics processors having multiple rendering processors, as in the prior art systems discussed above. However, in the technology described herein the tiles are allocated to the rendering processors for rendering in a different and innovative fashion.

In particular, each processor is, in effect, allocated a sequence of tiles that follows a path over the tiles that will, initially at least, step from one tile to a spatially adjacent tile of the render target (e.g. in the frame) (unless the next tile in the path has already been allocated for processing). This has the advantage that the sequence of tiles for processing each processor receives (initially at least) will tend to step from one tile to a spatially adjacent tile, thereby increasing the possibility of exploiting any spatial coherency between adjacent tiles in the frame.

Moreover, as each processor's sequence of tiles follows a path that covers every tile in frame (as the traversal path from which the sequence of tiles is taken includes every tile in the frame), each processor can, potentially, be allocated each and every tile of the frame for rendering (if necessary). This reduces the possibility of a processor standing idle for a relatively long period of time while other processors still have tiles to complete (and thus should help to ensure that each processor remains busy substantially until the final tiles of the frame are reached).

The Applicants believe therefore that the technology described herein provides, as will be discussed in more detail below, a more efficient tile allocation strategy and process for use with tile-based graphics processing systems having multiple rendering processors. In particular, it can provide both good load-balancing as between the different rendering processors, whilst still enhancing the possibility of individual rendering processors being able to exploit any spatial coherency between successive tiles that they operate on. Moreover, this can be achieved using relatively straightforward and non-complex processes and procedures (it need not, for example, require any complex analysis of the current or preceding frames), and in a flexible and efficient manner.

The tiles that the output frame (the render target) is divided into for allocation purposes in the technology described herein can be any desired and suitable size or shape. The tiles are in an embodiment all the same size and shape, as is known in the art, although this is not essential. In an embodiment, each tile is rectangular, and in an embodiment 16×16, 32×32 or 16×8 sampling positions in size.

It should also be noted here that while in one embodiment the tiles that the frame is divided into for the allocation purposes of the technology described herein are the same as or similar to the tiles that the rendering process will operate on in its "normal" rendering operation, the technology described herein may be performed using tiles of a different size and/or shape to the "rendering" tiles if desired.

Indeed, in one embodiment, the "tiles" that the technology described herein works on comprise a block of plural "rendering" tiles of the frame, such as, and in an embodiment, a 2×2 block of "rendering" tiles. In this case therefore, each rendering processor will be allocated a sequence of 2×2 "rendering" tile blocks in the manner of the technology described herein (and when it processes a "tile", will, in fact, process a 2×2 block (or some other grouping) of the "rendering" tiles, before moving onto the next such block of "rendering" tiles in its sequence, and so on).

This may be desirable where, for example, there is a very large number of "rendering" tiles, such as might be the case for high definition (HD) graphics, such that to reduce the "tile" allocation overhead for the technology described herein, for example, it might be desirable to reduce the number of individual "tiles" that need to be considered for the purposes of the technology described herein.

As discussed above, the sequence of tiles allocated to each rendering processor should start at a different tile for each rendering processor. The start tiles for each rendering processor may be selected as desired (and their positions may depend, e.g., on how many different rendering processors there are).

In an embodiment the start tile positions of the rendering processors are chosen so as to try to spread or distribute and space the rendering processors across the frame evenly (as evenly as possible), at least at the start of the processing of the frame. This will facilitate allowing each processor to start working in its own local area (thereby maintaining spatial coherence), before it starts to encounter tiles that have already been processed by other rendering processors. This may be achieved as desired. For example, where there are four rendering processors, each processor could start at a different corner of the frame.

The sequence of tiles that is allocated to each rendering processor will, as discussed above, follow a tile traversal path defined for the respective rendering processor. The tile traversal path for each rendering processor starts at the "start" tile for the respective processor and steps, initially at least, from one tile to a spatially adjacent tile in the frame. This helps to ensure that the respective processor can exploit any spatial coherency between the tiles it is processing. In an embodiment the tile traversal path for each processor is such as to maintain spatial coherency as far as is possible (i.e. will always step from one tile to a spatially adjacent tile as far as is possible as one moves along the path). Any suitable "space-filling" path or paths that achieve this can be used, such as an appropriate zig-zag pattern, U-order, Morton (Z) order, or Peano-order traversals, etc.

It should be noted here that while the tile traversal paths for each rendering processor should generally traverse from one tile to a spatially adjacent tile, it is envisaged that the technology described herein also encompasses the use of tile traversal paths where there are "jumps" in the path from one tile to a more distant tile (as will be discussed further below). However, in an embodiment there are relatively few such jumps (and in an embodiment there is one such jump at most), with the rest of the path always traversing from one tile to a spatially adjacent tile. In an embodiment the majority of the path traverses from one tile to a spatially adjacent tile.

As discussed above, the traversal paths which the sequences of tiles allocated to each rendering processor follow traverse all the tiles. This helps to ensure that the processors can continue to be allocated tiles from their path until all the tiles have been or are being processed, thereby keep all the processors busy (and thus providing good load-balancing between the processors) until the frame is finished.

It should be noted here that this does not mean that each rendering processor will process each and every tile in the frame and in its traversal path. Indeed, this will not happen as if a tile is reached in the traversal path that has already been allocated to another rendering processor for processing (and thus has either already been processed by another rendering processor or is currently being processed by another rendering processor), then that tile will, as discussed above, be skipped, and the tile allocation sequence continued at a later tile in the path. The intention rather is that the sequence for a rendering processor can if necessary include any tile of the frame, so that the processor should not run out of tiles that can be allocated to it until all the tiles have been processed (or at least are being processed by other rendering processors so that there are no more tiles left to be processed).

It will be appreciated from the above that a consequence of this arrangement is that the tile traversal paths which the tile sequences allocated to each rendering processor follow will overlap each other (indeed, this is intended, as it allows one processor to "steal" tiles from another processor's "path" if, for example, that other processor is taking longer to process its initial tiles).

In one embodiment, each processor's allocated tile sequence follows (is taken from) a different traversal path over the tiles of the frame. In other words, each respective tile traversal path traverses the tiles in a different order. In this case, the tile traversal paths may, and in an embodiment do, still have similar characteristics, such as each following a U-order and/or being rotationally related to each other, etc. For example, and in an embodiment, each rendering processor may have the same basic traversal path allocated to it (e.g. a zig-zag pattern, or a U-order pattern), but each path will be appropriately repositioned, and/or rotated, if necessary, e.g. depending on the starting tile for the processor (and the starting tiles for the other processors).

In an embodiment, each respective tile traversal path traverses the tiles in the same tile order (but starts at a different tile). In other words, there is a single global, common, tile traversal order shared by the tile traversal paths for all the rendering processors, and the tile traversal paths for each processor are distinguished (and made different) from each other by starting at a different tile within that common tile traversal order. For example, for the case where there are two rendering processors, a common tile traversal order that starts at one corner of the frame and that finishes at another corner of the frame (and that covers all the tiles in between) could be defined, with one processor's allocated tile traversal path starting at the tile beginning that "order", and the other processor's tile traversal path starting at the tile halfway along that order.

As will be discussed further below, this arrangement is particularly advantageous as it can require a smaller amount of state information to be maintained when operating the process and is particularly suitable for implementing in hardware.

It can also, for example, make the allocation of different tile sequences to different rendering processors more straightforward. For example, one can space the starting points for each rendering processor's tile traversal path equidistantly along the common tile traversal order (and in an embodiment this is done).

Where there is a single, common tile traversal order (and otherwise, where appropriate), then the tile traversal paths for processors that start part of the way along the common tile traversal order should be considered to loop back to and then continue from the beginning of the common tile traversal order so as to allow the tile traversal paths for those processors still to cover all the tiles of the frame. In other words, the common tile traversal order can be considered to define a continuous loop along which each processor will, in effect, travel, until all the tiles have been processed (or at least allocated to rendering processors).

As discussed above, each rendering processor is allocated the next tile along the traversal path it is, in effect, following, unless that next tile has already been allocated to another rendering processor, in which case the rendering processor is then allocated a later tile along the path that is still to be allocated to a rendering processor for processing. The processor could simply "jump" to the next free (unallocated) tile along the path (and in one embodiment this is done). In this case, the next tile to be allocated to the rendering processor will accordingly be selected as being the next tile along the path for the rendering processor that has yet to have been allocated to a rendering processor for processing.

However, in an embodiment, the rendering processor is not simply allocated the next free tile along its path, but instead is allocated a selected free (still to be allocated) tile along its path.

The selection of the free tile to allocate to the rendering processor in this arrangement may be based on any desired and suitable criteria, such as an estimate of the number of tiles left to be completed and how long they may take to complete. In an embodiment it is based on some selected, in an embodiment predetermined, partitioning of the free (the still to be allocated) tiles that are left at the time in question.

In an embodiment, the next tile to be allocated to the rendering processor in these circumstances (i.e. where the immediate next tile along its path has already been allocated to a rendering processor) is selected by identifying the next run of free (i.e. still to be allocated) tiles along the path for that rendering processor and allocating a tile from partway along that free run of tiles as the next tile for the processor to process. In an embodiment a tile midway along the run of free tiles is allocated (as a division by 2 is straightforward to implement in hardware).

Other arrangements would, of course, be possible.

The technology described herein may be implemented in any desired and suitable manner. For example, the path or paths for each processor may be predefined and stored in memory, or they may, for example, be derived in use. It would accordingly be possible to have static paths for the processor(s), or dynamic paths (i.e. paths that can be varied (and that vary) as the tiles are processed). In the latter case, the path(s) could, e.g., be changed as the tiles are processed in dependence upon the state of the tiles.

The path or paths may be defined in terms of a list of actual tile positions, or as a sequence of indices, each of which is mapped to a corresponding tile position. In the latter case there may, e.g., be a table associating the path sequence index to a corresponding tile position, or, as is known in the art, for certain forms of path, such as U-order, it may be possible to calculate the tile position directly from the path sequence index.

The traversal paths may be calculated and allocated to the rendering processors when desired, for example at the point when the display size is set, or at the point when rendering is to commence.

In an embodiment the same set of paths, starting tiles, etc., is used for each render target (e.g. of a given sequence rendering targets (e.g. frames)) that is being rendered, unless the rendering conditions, such as the frame size and/or number of tiles, change in such a manner as to make the existing configuration unsuitable.

The identification of the fact that a tile (potentially) to be allocated to a rendering processor has in fact already been allocated (and rendered) may be carried out in any desired and suitable manner. For example a simple Boolean could be stored for each tile to indicate whether it has been allocated for processing or not, and then checked when the tile is due to be allocated to a rendering processor. This may be particularly suitable where, for example, the next tile in the traversal path can be straightforwardly determined from, for example, the identity of the current tile of the processor in question and of the processor in question. This would be the case for, for example, simple raster, U-order, Morton-order and Peano-order paths.

Alternatively, it would, for example, be possible to explicitly construct lists of the sequences of tiles to be processed by each rendering processor (following their respective traversal paths) and then modify those lists as tiles are processed. This could be done, for example, by using m parallel doubly-linked lists (where m is the number of rendering processors) and then unlinking the relevant node from each list when a given tile is processed.

In an embodiment, a record is maintained for each processor of the number of free (unprocessed) tiles ahead of the processor's current tile along its path until a tile that has already been processed (allocated) will be reached. This record of free tiles can then be decremented by one each time the processor completes a tile. Then, when this count of free tiles reaches zero, that will indicate that the next tile along the path has already been processed (allocated). This provides a particularly straightforward and efficient mechanism for determining when a processor reaches a tile that has already been processed.

This arrangement is particularly suited to the arrangement of the technology described herein where each renderer's traversal path traverses the tiles in the same order, as in that case, it is, as will be discussed further below, possible to manage the tile allocations to each processor by maintaining for each processor simply a record of the tile it is currently processing and of the number of free tiles ahead of that tile along its path (i.e. of the number of unallocated (unprocessed) tiles in the path until the next already processed tile is reached).

Thus, in an embodiment, a record is maintained for each rendering processor of the tile that the processor is currently rendering and of the number of free tiles ahead of that tile along the processor's path until a tile that has already been allocated to another processor will be reached. This allows the technology described herein to be implemented using relatively little state information for each processor.

The record of the tile currently being processed by a processor may be maintained in any suitable form, such as in terms of an actual tile position, or the index along the path (order) of tiles that the processor has reached, etc.

The technology described herein may be used for any number of rendering processors. Typical arrangements may include 2 or 4 rendering processors.

It would also be possible for the technology described herein to be used for graphics processing systems that include "clustered" rendering processor architectures, such as, for example, where a "cluster" of dependent processors all share a common L1 cache. In this case, each such "cluster" of processors is in an embodiment allocated a sequence of tiles in the manner of the technology described herein (i.e. such that each "rendering processor" of the technology described herein in fact comprises a cluster of plural individual processors). Thus, in an embodiment, each rendering processor that has a path defined for it and tiles allocated to it in the manner of the technology described herein itself comprises a plurality of individual rendering processors, e.g., and in an embodiment that are dependent and/or share a cache.

In such "clustered" processor arrangements, the individual processors in each cluster are in an embodiment initially each allocated successive tiles along the path for that cluster and then take the next free tile along the cluster's path as they complete a tile (i.e. such that the cluster as a whole will work its way along the path until an already processed tile is reached). Other arrangements would be possible.

In an embodiment that uses clusters of processors, the "tiles" for the purposes of tile allocation in the manner of the technology described herein are configured to be blocks of plural "rendering" tiles (as discussed above) containing the same number of "rendering" tiles as there are processors in the cluster. Thus, for example, for clusters of 4 processors, in an embodiment each "tile" is a 2×2 block of rendering tiles, as discussed above. This simplifies the assignment of "rendering" tiles to processors in the cluster, as each processor may simply be assigned one "rendering" tile of the block of "rendering" tiles.

It would also be possible to have multiple levels of clustering (i.e. where there are clusters of clusters of processors), if desired, with the tile allocation paths, etc., then being configured accordingly.

Although in an embodiment the technology described herein is applied across an entire frame to be rendered, it would be possible to use the technology described herein in respect of only part of the frame, e.g., if that is the only part of the frame that is being drawn, if desired.

The technology described herein can be used irrespective of the form of output that the graphics processor may be providing. Thus, for example, it may be used where the tiles and the output frame are intended to form an image for display (e.g. on a screen or printer) (and in one embodiment this is the case). However, the technology described herein may also be used where the output is not intended for display, for example where the output frame (render target) is a texture that the graphics processor is being used to generate (e.g. in "render to texture" operation), or, indeed, where the output the graphics processor is being used to generate any other form of data array.

Similarly, although the technology described herein has been described above with particular reference to graphics processor operation, the Applicants have recognised that the principles of the technology described herein can equally be applied to other systems that process data in the form of blocks in a similar manner to tile-based graphics processing systems (in essence to any data processing system in which an output array of data is generated by processors of the data processing system generating blocks of data representing particular regions of the output array of data). Thus the technology described herein may equally be used, for example, for video processing (as video processing operates on blocks of data analogous to tiles in graphics processing), and for 2D image composition (as again the composition frame buffer will be processed as distinct blocks of data).

Thus, a third embodiment of the technology described herein comprises a method of generating an output array of data comprising a plurality of blocks of data in a data processing system that comprises plural data block generating processors, the method comprising:

initially allocating a different data block of the plurality of data blocks to be generated to each data block generating processor; and when each processor completes the data block it is currently processing, allocating another data block that is still to be processed to that processor, and so on, until all the data blocks to be generated have been allocated to processors;

wherein the next data block to be allocated to a given processor for processing is selected as being the next data block along a path defined for that given processor that starts at the data block initially allocated to that processor and that will traverse every data block to be generated if followed to its end, and which path is configured such that, at least for the initial data blocks along the path, adjacent data blocks in the path are spatially adjacent in the output array of data, unless the next data block in the path for the given processor has already been allocated to another processor, in which case the next data block to be allocated to the given processor is selected to be a data block further on in the data block traversal path for that given processor that is still to be allocated to a processor for processing.

A fourth embodiment of the technology described herein comprises a data processing system comprising:

a plurality of processors for generating output blocks of data representing particular regions of an output array of data to be provided by the data processing system; and a data block allocator for allocating data blocks to be generated to produce an output array of data to the plural processors; wherein the data block allocator is configured to:

initially allocate a different data block of the data blocks to be generated to each data block generating processor; and to, when a processor completes the data block it is currently processing, allocate another data block that is still to be processed to that processor, and so on, until all the data blocks to be generated have been allocated to processors; and wherein the data block allocator is configured to:

select the next data block to be allocated to a given processor for processing as being the next data block along a path defined for that given processor that starts at the data block initially allocated to that processor and that will traverse every data block to be generated if followed to its end, and which path is configured such that, at least for the initial data blocks along the path, adjacent data blocks in the path are spatially adjacent in the output data array, unless the next data block in the path for the given processor has already been allocated to another processor, in which case it selects a data block further on in the data block traversal path for the given processor that is still to be allocated to a processor for processing as the next data block to be allocated to the given processor for processing.

The technology described herein also extends to the provision of a particular hardware element for performing the data block (e.g. tile) allocation of the technology described herein.

Thus, a fifth embodiment of the technology described herein comprises a data block allocation apparatus for use in a data processing system in which an output array of data is generated by the data processing system generating blocks of data representing particular regions of the output array of data and which comprises plural data block generating processors, the data block allocation apparatus comprising:

means for initially allocating a different data block of a set of data blocks to be generated to produce an output array of data to each data block generating processor of a set of plural data block generating processors of a data processing system; and means for, when a processor completes the data block it is currently processing, allocating another data block that is still to be processed to that processor, and so on, until all the data blocks to be generated have been allocated to processors;

wherein the means for, when a processor completes the data block it is currently processing, allocating another data block that is still to be processed to that processor is configured to:

select the next data block to be allocated to a given processor for processing as being the next data block along a path defined for that processor that starts at the data block initially allocated to that processor and that will traverse every data block to be generated if followed to its end, and which path is configured such that, at least for the initial data blocks along the path, adjacent data blocks in the path are spatially adjacent in the output data array, unless the next data block in the path for the given processor has already been allocated to another processor, in which case it selects a data block further on in the data block traversal path for the given processor that is still to be allocated to a processor for processing as the next data block to be allocated to the given processor for processing.

As will be appreciated by those skilled in the art, all these embodiments of the technology described herein can and in an embodiment do include any one or more or all of the features of the technology described herein.

In these arrangements, the output data blocks may, e.g., be, and in an embodiment are, output tiles produced by a tile-based graphics processing system (a graphics processor), video data blocks produced by a video processing system (a video processor), and/or composite frame tiles produced by a graphics composition processing system, etc. The processors are, e.g., and in an embodiment, rendering processors. Similarly, the output array of data is in an embodiment all or part of an output render target, such as an output frame, to be generated by a graphics processing system.

The various functions of the technology described herein can be carried out in any desired and suitable manner. For example, the functions of the technology described herein can be implemented in hardware or software, as desired. Thus, for example, the various "means" and function elements of the technology described herein may comprise a suitable processor or processors, controller or controllers, functional units, circuitry, processing circuitry, processing logic, microprocessor arrangements, etc., that are operable to perform the various functions, etc., such as appropriately dedicated hardware elements and/or processing circuitry, and/or programmable hardware elements and/or processing circuitry that can be programmed to operate in the desired manner.

In an embodiment the graphics processor and/or tile allocation unit is implemented as a hardware element (e.g. ASIC). Thus, in another embodiment the technology described herein comprises a hardware element including the apparatus of, or operated in accordance with the method of, any one or more of the embodiments of the technology described herein described herein.

It should also be noted here that, as will be appreciated by those skilled in the art, the various functions, etc., of the technology described herein may be duplicated and/or carried out in parallel on a given processor.

The technology described herein is applicable to any form or configuration of (tile based) graphics processor and renderer, such as processors having a "pipelined" rendering arrangement (in which case the renderer will be in the form of a rendering pipeline).

In some embodiments the data processing system, graphics processing system, data processors, graphics processors, processing circuitry, etc., may be in communication with memory and/or one or more memory devices that store the data described herein, such as the data (e.g. the input and/or output data) for the data blocks, the records referred to herein, etc., and/or that store software for performing the processes described herein. The data processing system, graphics processing system, data processors, graphics processors, processing circuitry, etc., may also be in communication with a display for displaying images based on the generated data blocks.

As will be appreciated from the above, the technology described herein, in its embodiments at least, operates in essence to partition the set of tiles (blocks) to be processed in such a way that different processors will start working on their own local areas of the output frame (thereby maintaining spatial coherence) but can then progress towards and into other processor's starting areas if those processors are taking longer to process their blocks, thereby facilitating load-balancing and ensuring that all the processors substantially remain busy until all the output is finished.

Thus, a further embodiment of the technology described herein comprises a method of allocating blocks of data to processors in a data processing system having plural data processors each operable to generate an output block of the output data array, the method comprising: allocating the blocks of data to be processed for an output data array to the plural data processors in such a way that each processor will initially receive a sequence of blocks for processing from a particular region of the output data array, and then receive blocks for processing from a region of the output data array initially allocated to another data processor, until all the blocks for the output have been allocated for processing.

Another embodiment of the technology described herein comprises an apparatus for allocating blocks of data to processors in a data processing system having plural data processors each operable to generate an output block of the output data array, the apparatus comprising: block allocation means configured to allocate the blocks of data to be processed for an output data array to the plural data processors in such a way that each processor will initially receive a sequence of blocks for processing from a particular region of the output data array, and then receive blocks for processing from a region of the output data array initially allocated to another data processor, until all the blocks for the output have been allocated for processing.

Another embodiment of the technology described herein comprises a data processing system comprising:

a plurality of data processors each operable to generate output blocks of an output data array to be generated by the data processing system; and a data block allocator for allocating blocks of data for processing to the data processors of the data processing system and configured to allocate the blocks of data to be processed for an output data array to the plural data processors in such a way that each processor will initially receive a sequence of blocks for processing from a particular region of the output data array, and then receive blocks for processing from a region of the output data array initially allocated to another data processor, until all the blocks for the output have been allocated for processing.

As will be appreciated by those skilled in the art, all these embodiments of the technology described herein can and in an embodiment do include any one or more or all of the features of the technology described herein. Thus, for example, the particular regions of the output data array that are initially allocated to each processor are in an embodiment distributed across the output data array, and, e.g., spaced as far from each other as is possible.

In these arrangements, the output blocks may, e.g., be, and in an embodiment are, output tiles produced by a tile-based graphics processing system (a graphics processor), video data blocks produced by a video processing system (a video processor), and/or composite frame tiles produced by a graphics composition processing system, etc. Similarly, the processors are in an embodiment rendering processors of a graphics processing system. Similarly, the output array of data is in an embodiment all or part of an output render target, such as an output frame, to be generated by a graphics processing system.

As will be appreciated from the above, the technology described herein is particularly, although not exclusively, applicable to graphics processors and processing devices, and accordingly extends to a graphics processor and a graphics processing platform including the apparatus of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further embodiment of the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described. These embodiments will be described primarily with reference to the use of the technology described herein in a graphics processing system. However, as noted above, the technology described herein is applicable to other data processing systems which process data in blocks representing portions of a whole output, such as video processing.

FIG. 1 shows schematically a graphics processor 10 that may be operated in accordance with the technology described herein.

The graphics processor 10 includes a geometry processor 11 and plural rendering processors 12, 13, 14, 15, all of which can access a memory 16. The memory 16 may be, as is known in the art, "on-chip" with the geometry processor 11 and renderers 12, 13, 14 and 15, or may be an external memory that can be accessed by the geometry processor 11 and the renderers 12, 13, 14 and 15.

FIG. 1 shows a graphics processor 10 with four rendering processors, but other configurations of plural rendering processors can be used if desired.

The memory 16 stores, inter alia, and as shown in FIG. 1, a set of raw geometry data 17 (which is, for example, provided by the graphics processor driver or an API running on a host system (microprocessor) of the graphics processor 10, as is known in the art), and a set of transformed geometry data 18 (which is the result of various transformation and processing operations carried out on the raw geometry 17, again, as is known in the art), and a set of tile (primitive) lists 19.

The tile lists 19 each represent a respective tile that the rendering output, such as a frame to be displayed, to be generated by the graphics processor 10 is divided into for rendering purposes, and contain data, commands, etc., for the respective primitives that are to be processed for the respective tile that the list corresponds to, as is known in the art.

The transformed geometry data 18 comprises, for example, transformed vertices (vertex data), etc., as is known in the art.

The geometry processor 11 takes as its input the raw geometry data 17 stored in the memory 16 in response to receiving commands to execute a rendering job 20 from, e.g., the graphics processor driver, and processes that data to provide transformed geometry data 18 (which it then stores in the memory 16) comprising the geometry data in a form that is ready for 2D placement in the render output (e.g. frame to be displayed).

The geometry processor 11 and the processes it carries out can take any suitable form and be any suitable and desired such processes known in the art. The geometry processor 11 may, e.g., include a programmable vertex shader (not shown) that executes vertex shading operations to generate the desired transformed geometry data 18.

As shown in FIG. 1, the geometry processor 11 also includes a tiling unit 21. This tiling unit 21 carries out the process of allocating the primitives to the tile lists which are then used to identify the primitives that should be rendered for each tile that is to be rendered to generate the render output (which in this embodiment is a frame to be rendered for display). To do this, the tiling unit 21 takes as its input the transformed and processed vertex data 18 (i.e. the positions of the primitives in the render output), builds tile lists using that data, and stores those tile lists as the tile lists 19 in the memory 16.

To prepare the tile lists, the tiling unit 21 takes each transformed primitive in turn, determines the location for that primitive, compares the primitive's location with the locations of (the render output areas covered by) the respective tiles that the render output is divided into, and then includes the primitive in the respective tile lists 19 for the tiles that the primitive in question is determined as potentially falling within.

In the present embodiment, the tiling unit 21 determines the location of each primitive and accordingly the tiles that a given primitive falls within or intersects using a bounding box binning technique. Thus, as is known in the art, the tiling unit 21 uses the determined transformed vertex positions it is provided with for a given primitive to construct a bounding box for the primitive and then identifies which rendering tiles the primitive's bounding box falls within (intersects). This process can be carried out in any suitable and desired manner, such as by using techniques already known for this purpose in the art. The bounding box for a primitive is in this embodiment generated by the tiling unit 21, but other arrangements would, of course, be possible.

It would also be possible to use other techniques for determining and locating the primitives within the render output in relation to the rendering tiles, if desired. For example exact binning techniques could equally be used, as is known in the art.

The rendering processors 12, 13, 14 and 15 take, as is known in the art the transformed primitives and rasterise and render the primitives to generate output graphics fragment (sampling point) data for each respective sampling position within the tile of the render output that they are processing. To this end, each rendering processor 12, 13, 14 and 15 includes a respective rasterising unit, rendering unit and set of tile buffers (not shown), which operate, in this embodiment, in the usual manner for such units in graphics processing systems.

Thus the rasterising unit of a respective rendering processor will take as its input a primitive and its vertices, rasterise the primitive to graphics fragments, and provide those fragments to the rendering unit of the respective rendering processor. The rendering unit will then perform a number of rendering processes, such as texture mapping, blending, shading, etc., on the fragments, and generate rendered fragment data which it stores in a tile buffer or buffers of the respective rendering processor for providing to an output render target. Once the rendering processor has completed its processing of a given tile, the stored, rendered tile data is output from the tile buffer(s) to the output render target, which in this embodiment is a frame buffer 22 for a display.

As discussed above, the technology described herein is applicable to a rendering system in which the render output (e.g. frame to be rendered) is rendered as plural individual rendering tiles. Thus each rendering processor 12, 13, 14, 15 operates on one respective rendering tile of the render output at any given time, and once it has completed the processing of its current tile, writes the rendered output for that tile to the frame buffer 22, and then moves on to processing another tile of the render output and so on. The rendering processor determines which primitives to process for its current tile by retrieving the tile list for the tile that it is processing from the tile lists 19 in the memory 16.

As the graphics processor 10 includes plural rendering processors 12, 13, 14 and 15, there needs to be a mechanism by which the tiles making up the render output are allocated to the respective rendering processors for processing. This operation is performed in the present embodiment by a tile allocator 23 of the graphics processor 10, which operates to allocate tiles to be processed to the rendering processors 12, 13, 14 and 15 as the rendering job 20 is being executed by the graphics processor 10. This operation of the tile allocator 23 will now be described in more detail.

As discussed above, the principle idea of the technology described herein is to find a way to partition the set of tiles to be rendered so that the different rendering processors start working in their own local areas, maintaining spatial coherence, but then to allow the allocation of tiles to spill over into other processors' areas if those processors are running slowly. The latter gives a load balancing property, so that all processors are fully utilised until everything is finished.

This is achieved in the present embodiment by defining a tile traversal path (i.e. the sequence that each processor will process the set of tiles to be rendered in) for each respective rendering processor, which tile traversal paths have different starting points and step from one adjacent tile to another. The tile allocator 23 then operates to allocate to each respective rendering processor 12, 13, 14, 15 the next tile along its defined tile traversal path, unless that next tile has been already allocated to another rendering processor for processing (i.e. has already been processed by another rendering processor or is currently being processed by another rendering processor), in which case the tile allocator operates, as will be discussed further below, to select a later tile in the defined tile traversal path for the rendering processor in question for processing.

The tile traversal paths that are defined for each rendering processor could, e.g., be provided to the tile allocator 23 by the driver for the graphics processor 10. Alternatively, the tile traversal paths could be determined and defined by the tile allocator 23 itself, for example, upon receipt of data and commands from the graphics processor driver that a sequence of tiles to be processed is starting, together with the number of tiles. The tile allocator could then define appropriate rendering paths based on, e.g., its knowledge of how many rendering processors the graphics processor 10 has.

To allocate a respective rendering tile to a given rendering processor, the tile allocator 23 can, for example, provide a tile list pointer to the processor indicating which tile list it is to process next.

A first embodiment of such an arrangement that is in accordance with the technology described herein will now be described.

For illustration, a very small output frame consisting of 4×4 rendering tiles, numbered 0 to 15 will be considered:

| 0 | 1 | 2 | 3 |
|---|---|---|---|
| 4 | 5 | 6 | 7 |
| 8 | 9 | 10 | 11 |
| 12 | 13 | 14 | 15 |

It will also be assumed that there are four rendering processors A, B, C and D.

As discussed above, a tile traversal path is defined for each rendering processor, such that the rendering processors start in widely separated regions and only come together at the end. An example of a suitable such path for one processor is a zig-zag pattern starting in the corner at the 0 tile:

Start Here → 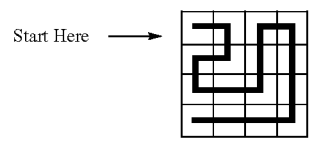

The paths for the other processors in this embodiment may then be defined to be similar, but to start in different corners of the frame and to be rotated by 90 degrees each.

Figure 2:
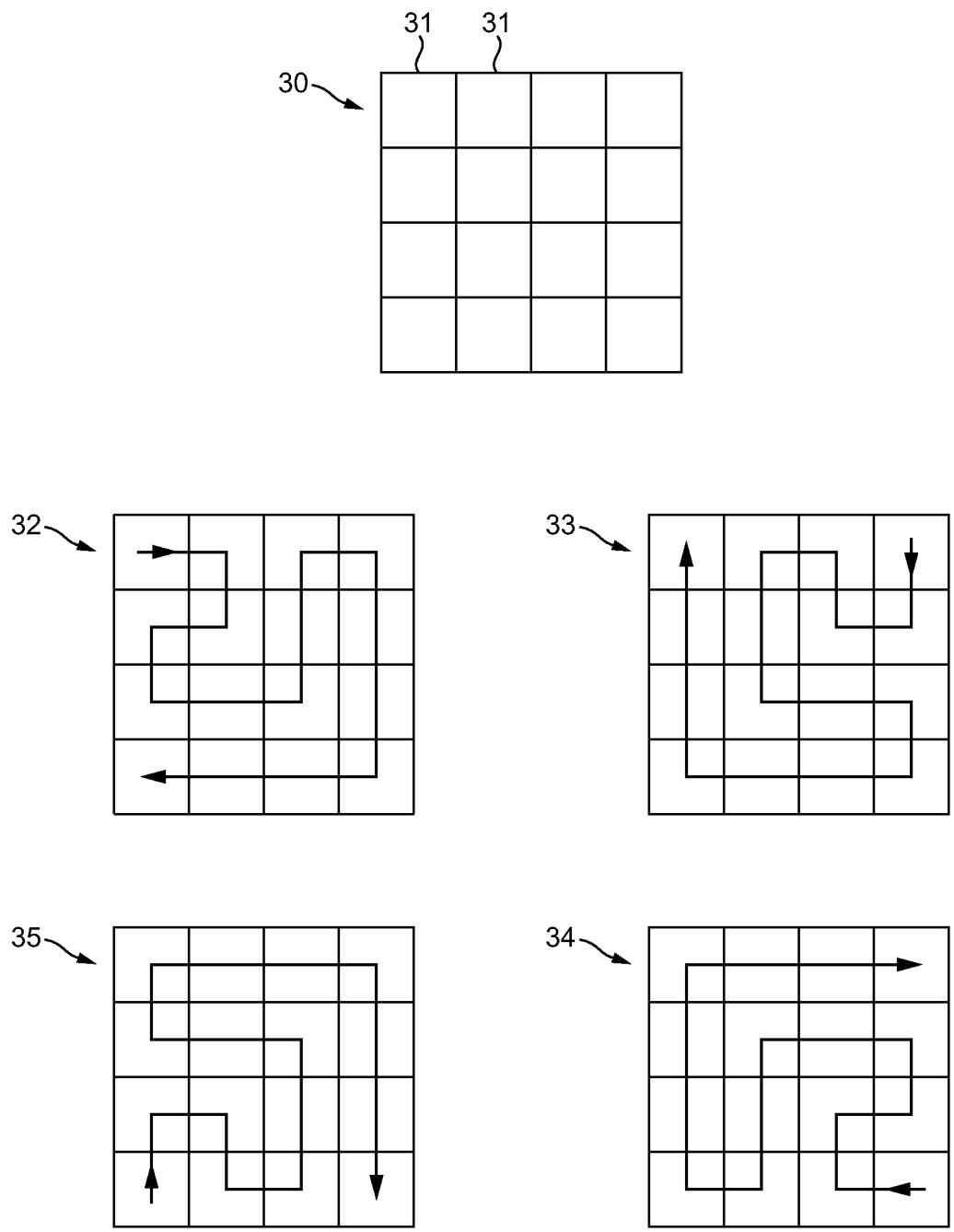
FIG. 2 shows a first embodiment of tile traversal paths to be used when rendering an output frame using the graphics processing system of FIG. 1.

FIG. 2 illustrates this and shows respective tile traversal paths 32, 33, 34 and 35 for four rendering processors when processing an output frame 30 consisting of 4×4 rendering tiles 31.

In this arrangement, each tile traversal path accordingly defines a tile traversal over (and potential processing order) for its respective processor, which in this case will be as follows:

A: 0, 1, 5, 4, 8, 9, 10, 6, 2, 3, 7, 11, 15, 14, 13, 12
B: 3, 7, 6, 2, 1, 5, 9, 10, 11, 15, 14, 13, 12, 8, 4, 0
C: 15, 14, 10, 11, 7, 6, 5, 9, 13, 12, 8, 4, 0, 1, 2, 3
D: 12, 8, 9, 13, 14, 10, 6, 5, 4, 0, 1, 2, 3, 7, 11, 15

Initially, all processors are inactive, so the tiles (the command lists for the tiles) are assigned to them by the tile allocator 23 in their order following their defined traversal paths. As a tile is allocated to a processor, it is removed from all the lists.

This is illustrated in the sequence below, in which the tiles currently being processed are shown in bold and tiles that have been allocated are crossed out. Similarly, in the diagrams currently active tiles are shown in bold and dark gray, completed tiles in light gray, and the subscript for the tiles shows the processor that worked (or is working) on them.

Following the above paths defined for the processors A, B, C, D, the allocation of tiles for processing would start like this:

A: 0, 1, 5, 4, 8, 9, 10, 6, 2, 3, 7, 11, 15, 14, 13, 12 Assign 0 to A
B. 3, 7, 6, 2, 1, 5, 9, 10, 11, 15, 14, 13, 12, 8, 4, ~~0~~
C: 15, 14, 10, 11, 7, 6, 5, 9, 13, 12, 8, 4, ~~0~~, 1, 2, 3
D: 12, 8, 9, 13, 14, 10, 6, 5, 4, ~~0~~, 1, 2, 3, 7, 11, 15

| 0$_A$ | 1 | 2 | 3 |
|---|---|---|---|
| 4 | 5 | 6 | 7 |
| 8 | 9 | 10 | 11 |
| 12 | 13 | 14 | 15 |

A: 0, 1, 5, 4, 8, 9, 10, 6, 2, ~~3~~, 7, 11, 15, 14, 13, 12
B. 3, 7, 6, 2, 1, 5, 9, 10, 11, 15, 14, 13, 12, 8, 4, ~~0~~ Assign 3 to B
C: 15, 14, 10, 11, 7, 6, 5, 9, 13, 12, 8, 4, ~~0~~, 1, 2, ~~3~~
D: 12, 8, 9, 13, 14, 10, 6, 5, 4, ~~0~~, 1, 2, ~~3~~, 7, 11, 15

| 0$_A$ | 1 | 2 | 3$_B$ |
|---|---|---|---|
| 4 | 5 | 6 | 7 |
| 8 | 9 | 10 | 11 |
| 12 | 13 | 14 | 15 |

A: 0, 1, 5, 4, 8, 9, 10, 6, 2, ~~3~~, 7, 11, ~~15~~, 14, 13, 12
B. 3, 7, 6, 2, 1, 5, 9, 10, 11, ~~15~~, 14, 13, 12, 8, 4, ~~0~~
C: 15, 14, 10, 11, 7, 6, 5, 9, 13, 12, 8, 4, ~~0~~, 1, 2, ~~3~~ Assign 15 to B
D: 12, 8, 9, 13, 14, 10, 6, 5, 4, ~~0~~, 1, 2, ~~3~~, 7, 11, ~~15~~

| 0$_A$ | 1 | 2 | 3$_B$ |
|---|---|---|---|
| 4 | 5 | 6 | 7 |
| 8 | 9 | 10 | 11 |
| 12 | 13 | 14 | 15$_C$ |

A: 0, 1, 5, 4, 8, 9, 10, 6, 2, ~~3~~, 7, 11, ~~15~~, 14, 13, ~~12~~
B. 3, 7, 6, 2, 1, 5, 9, 10, 11, ~~15~~, 14, 13, ~~12~~, 8, 4, ~~0~~
C: 15, 14, 10, 11, 7, 6, 5, 9, 13, ~~12~~, 8, 4, ~~0~~, 1, 2, ~~3~~
D: 12, 8, 9, 13, 14, 10, 6, 5, 4, ~~0~~, 1, 2, ~~3~~, 7, 11, ~~15~~ Assign 12 to D

| 0$_A$ | 1 | 2 | 3$_B$ |
|---|---|---|---|
| 4 | 5 | 6 | 7 |
| 8 | 9 | 10 | 11 |
| 12$_D$ | 13 | 14 | 15$_C$ |

If it is assumed that, e.g. due to there not being much detail in the sky, processor B is the first to finish its current tile, then tile 3 will be crossed off the list for processor B and processor B allocated the next tile along its defined path, which in this case is tile 7.

A: 0, 1, 5, 4, 8, 9, 10, 6, 2, ~~3~~, ~~7~~, 11, ~~15~~, 14, 13, ~~12~~
B. ~~3~~, 7, 6, 2, 1, 5, 9, 10, 11, ~~15~~, 14, 13, ~~12~~, 8, 4, ~~0~~ Assign 7 to B-this is adjacent to the previous tile
C: 15, 14, 10, 11, ~~7~~, 6, 5, 9, 13, ~~12~~, 8, 4, ~~0~~, 1, 2, ~~3~~
D: 12, 8, 9, 13, 14, 10, 6, 5, 4, ~~0~~, 1, 2, ~~3~~, ~~7~~, 11, ~~15~~

| 0$_A$ | 1 | 2 | 3$_B$ |
|---|---|---|---|
| 4 | 5 | 6 | 7$_B$ |
| 8 | 9 | 10 | 11 |
| 12$_D$ | 13 | 14 | 15$_C$ |

The tile allocation process then continues accordingly, and as can be seen, for some time at least, will tend to assign only adjacent tiles to free processors. This is good for coherency.

C:14

| 0$_A$ | 1 | 2 | 3$_B$ |
|---|---|---|---|
| 4 | 5 | 6 | 7$_B$ |
| 8 | 9 | 10 | 11 |
| 12$_D$ | 13 | 14$_C$ | 15$_C$ |

A:1

| 0$_A$ | 1$_A$ | 2 | 3$_B$ |
|---|---|---|---|
| 4 | 5 | 6 | 7$_B$ |
| 8 | 9 | 10 | 11 |
| 12$_D$ | 13 | 14$_C$ | 15$_C$ |

B:6

| 0$_A$ | 1$_A$ | 2 | 3$_B$ |
|---|---|---|---|
| 4 | 5 | 6$_B$ | 7$_B$ |
| 8 | 9 | 10 | 11 |
| 12$_C$ | 13 | 14$_C$ | 15$_C$ |

D:8

| 0$_A$ | 1$_A$ | 2 | 3$_B$ |
|---|---|---|---|
| 4 | 5 | 6$_B$ | 7$_B$ |
| 8$_D$ | 9 | 10 | 11 |
| 12$_D$ | 13 | 14$_C$ | 15$_C$ |

B:2

| 0$_A$ | 1$_A$ | 2$_B$ | 3$_B$ |
|---|---|---|---|
| 4 | 5 | 6$_B$ | 7$_B$ |
| 8$_D$ | 9 | 10 | 11 |
| 12$_D$ | 13 | 14$_C$ | 15$_C$ |

A:5

| 0$_A$ | 1$_A$ | 2$_B$ | 3$_B$ |
|---|---|---|---|
| 4 | 5$_A$ | 6$_B$ | 7$_B$ |
| 8$_D$ | 9 | 10 | 11 |
| 12$_D$ | 13 | 14$_C$ | 15$_C$ |

After a while, however, the situation will arise where the next tile for a processor has already been processed. This is the situation after the above sequence of allocations. The tile lists for each processor at this point look like this:

A: ~~0~~, ~~1~~, 5, 4, ~~8~~, 9, 10, ~~6~~, ~~2~~, ~~3~~, ~~7~~, 11, ~~15~~, ~~14~~, 13, ~~12~~
B. ~~3~~, ~~7~~, ~~6~~, 2, ~~1~~, ~~5~~, 9, 10, 11, ~~15~~, ~~14~~, 13, ~~12~~, ~~8~~, 4, ~~0~~
C: ~~15~~, 14, 10, 11, ~~7~~, ~~6~~, ~~5~~, 9, 13, ~~12~~, ~~8~~, 4, ~~0~~, ~~1~~, ~~2~~, ~~3~~
D: ~~12~~, 8, 9, 13, ~~14~~, 10, ~~6~~, ~~5~~, 4, ~~0~~, ~~1~~, ~~2~~, ~~3~~, ~~7~~, 11, ~~15~~

If processor B is again lightly loaded and ready again, having finished tile 2, it will be determined its next tile (tile 1) has already been processed and so instead, the system looks for a free (still to be processed) tile further along processor B's path (list) and accordingly skips ahead to tile 9:

A: ~~0, 1,~~ 5, 4, ~~8, 9,~~ 10, ~~6, 2, 3, 7,~~ 11, ~~15, 14,~~ 13, ~~12~~
B: ~~3, 7, 6, 2, 1, 5,~~ 9, 10, 11, ~~15, 14,~~ 13, ~~12, 8,~~ 4, ~~0~~ Skip 1 and 5, assign 9 to B.
C: ~~15,~~ 14, 10, 11, ~~7, 6, 5, 9,~~ 13, ~~12, 8,~~ 4, ~~0, 1, 2, 3~~
D: ~~12,~~ 8, ~~9,~~ 13, ~~14,~~ 10, ~~6, 5,~~ 4, ~~0, 1, 2, 3, 7,~~ 11, ~~15~~

| $0_A$ | $1_A$ | $2_B$ | $3_B$ |
|---|---|---|---|
| 4 | $5_A$ | $6_B$ | $7_B$ |
| $8_D$ | $9_B$ | 10 | 11 |
| $12_D$ | 13 | $14_C$ | $15_C$ |

Here, B is now, in effect, "stealing" tiles from near D's starting corner.

This process goes on until all the tiles have been assigned for processing. It may end up with a final state something like this:

| $0_A$ | $1_A$ | $2_B$ | $3_B$ |
|---|---|---|---|
| $4_A$ | $5_A$ | $6_B$ | $7_B$ |
| $8_D$ | $9_B$ | $10_B$ | $11_C$ |
| $12_D$ | $13_D$ | $14_C$ | $15_C$ |

On larger screens, there will be more time before the individual processor's paths "collide", making this attractive as each processor spends a greater percentage of its time processing adjacent tiles (and thus performing adjacent memory accesses).

Although the above embodiment uses a simple zig-zag path, any suitable path such as U-order, Morton-order and Peano-order traversals can be used. Indeed, it should be possible to devise efficient, coherency maintaining, paths for any number of processors m, and any number of frame tiles n.

In the present embodiment, the tile traversal paths are explicitly constructed as lists and then tiles removed from each list as they are processed. For each list, this can be done in O(m) time using m parallel doubly-linked lists.

Other arrangements would be possible.

For example, if given the currently executing tile index, and the processor number, it is simple (computationally speaking) to calculate the next tile index, then a single Boolean can be stored for each tile. This is the case for simple raster, U, Morton and Peano orderings.

Then, as a processor finishes its current tile, its current tile index is used to calculate the next tile, and if this is free, its command list is dispatched and the Boolean is set to indicate that this tile has been dealt with. If, on the other hand, the Boolean is already set (i.e. the tile has already been processed), the next tile index is calculated and the next Boolean is searched. If the system gets back to the just-finished tile index, then there is no more work to do and processing stops.

This system is more economical on memory, but more expensive as it reaches the ends of the lists and relatively few tiles are available. On average, to dispatch each job, this is an O(n) operation as we have to search among the tiles for a free one.

The method used to determine the next tile index can be static or dynamic. For example, the traversal order can be changed depending on the state of the tiles.

Another embodiment of the technology described herein will now be described.

In the previous embodiment, each processor's tile traversal path traversed the tiles in a different order. However, if, instead, a single global order to the traversal paths is assigned, and the processors are started at different points within that traversal order, then a single array can be used to represent the traversal order.

(The global traversal order should again be chosen to maximize coherency between adjacent tiles in the order. Again, space-filling sequences such as Morton, Peano, Hilbert or U-order will work well for this purpose).

For any arbitrary number of processors, using a common traversal order also makes it easier to distribute the processing evenly between them—the processors can just be started equidistantly along the traversal order.

The following example illustrates this and uses the following common traversal order:

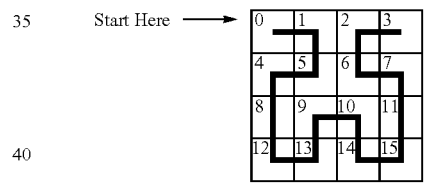

Start Here →

This (Hilbert-order) traversal can be represented in a table as follows:

| Sequence Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Tile number | 0 | 1 | 5 | 4 | 8 | 12 | 13 | 9 | 10 | 14 | 15 | 11 | 7 | 6 | 2 | 3 |

In this embodiment the starting point, initial, tiles for each processor are assigned to the processors by distributing them as evenly as possible within the tile traversal order (sequence). Formally, processor p is assigned sequence index (pm)/n, expressed as an integer, where n is the number of processors, and m the number of tiles.

So, as an example, for 3 processors (A, B and C) in a 16-tile sequence, the initial traversal order indices (positions) for each processor will be 0, 5 and 10, corresponding to tiles 0, 12, and 15. These will be the first tiles worked on.

As before, the diagrams below represent currently active tiles in bold and dark gray, completed tiles in light gray, and subscript the tiles to show which processor worked on them. Here is the initial state:

Initial state

| 0_A | 1 | 2 | 3 | Proc | Seq. | Free |
|---|---|---|---|---|---|---|
| 4 | 5 | 6 | 7 | A | 0 | 4 |
| 8 | 9 | 10 | 11 | B | 5 | 4 |
| 12_B | 13 | 14 | 15_C | C | 11 | 5 |

This corresponds to the sequence array like this:

| Sequence Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Tile number | 0 | 1 | 5 | 4 | 8 | 12 | 13 | 9 | 10 | 14 | 15 | 11 | 7 | 6 | 2 | 3 |
| Processor | A | | | | | B | | | | | C | | | | | |
| Free slots ahead | 4 | 1 | 2 | 3 | 4 | 4 | 1 | 2 | 3 | 4 | 5 | 1 | 2 | 3 | 4 | 5 |

In this embodiment, rather than storing a set of Booleans to track which tiles have been worked on, as can be seen there is always a contiguous free set of tiles in the sequence (order), ahead of the current position that each processor is working on.

As each processor completes a tile, as long as there are free slots ahead of it in its path then it can just start processing the next tile in the sequence and decrease its number of free slots. For example, if processor C finishes first, it will move on one tile in the sequence, from 15 to 11, and its number of free slots will be decreased by one (state changes are indicated with bold type in the state table):

C completes
New sequence index 11
Tile 11

| 0_A | 1 | 2 | 3 | Proc | Seq. | Free |
|---|---|---|---|---|---|---|
| 4 | 5 | 6 | 7 | A | 0 | 4 |
| 8 | 9 | 10 | 11_C | B | 5 | 4 |
| 12_B | 13 | 14 | 15_C | C | 11 | 4 |

This corresponds to the sequence state:

| Sequence Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Tile number | 0 | 1 | 5 | 4 | 8 | 12 | 13 | 9 | 10 | 14 | 15 | 11 | 7 | 6 | 2 | 3 |
| Processor | A | | | | | B | | | | | | C | | | | |
| Free slots ahead | 4 | | | | | 4 | | | | | | 4 | | | | |

Note that this does not change the number of free slots in front of processor B, since the tile at sequence position 10 has already been completed. This makes update of the data structures particularly simple and fast.

As processing continues, the processors complete tile operations at variable rates and "consume" the free slots ahead of them in the sequence list:

B completes
New sequence index 6
Tile 13

| 0_A | 1 | 2 | 3 | Proc | Seq. | Free |
|---|---|---|---|---|---|---|
| 4 | 5 | 6 | 7 | A | 0 | 4 |
| 8 | 9 | 10 | 11_C | B | 6 | 3 |
| 12_B | 13_B | 14 | 15_C | C | 11 | 4 |

-continued

A completes
New sequence index 1
Tile 1

| 0_A | 1_A | 2 | 3 | Proc | Seq. | Free |
|---|---|---|---|---|---|---|
| 4 | 5 | 6 | 7 | A | 1 | 3 |
| 8 | 9 | 10 | 11_C | B | 6 | 3 |
| 12_B | 13_B | 14 | 15_C | C | 11 | 4 |

A completes
New sequence index 2
Tile 5

| 0_A | 1_A | 2 | 3 | Proc | Seq. | Free |
|---|---|---|---|---|---|---|
| 4 | 5_A | 6 | 7 | A | 2 | 2 |
| 8 | 9 | 10 | 11_C | B | 6 | 3 |
| 12_B | 13_B | 14 | 15_C | C | 11 | 4 |

C completes
New sequence index 12
Tile 7

| 0_A | 1_A | 2 | 3 | Proc | Seq. | Free |
|---|---|---|---|---|---|---|
| 4 | 5_A | 6 | 7_C | A | 2 | 2 |
| 8 | 9 | 10 | 11_C | B | 6 | 3 |
| 12_B | 13_B | 14 | 15_C | C | 12 | 3 |

A completes
New sequence index 3
Tile 4

| 0_A | 1_A | 2 | 3 | Proc | Seq. | Free |
|---|---|---|---|---|---|---|
| 4_A | 5_A | 6 | 7_C | A | 3 | 1 |
| 8 | 9 | 10 | 11_C | B | 6 | 3 |
| 12_B | 13_B | 14 | 15_C | C | 12 | 3 |

-continued

A completes
New sequence index 4
Tile 8

| 0_A | 1_A | 2 | 3 | Proc | Seq. | Free |
|---|---|---|---|---|---|---|
| 4_A | 5_A | 6 | 7_C | A | 4 | 0 |
| 8 | 9 | 10 | 11_C | B | 6 | 3 |
| 12_B | 13_B | 14 | 15_C | C | 12 | 3 |

At this point, processor A runs out of free slots ahead of itself. Here is the state of the sequence:

| Sequence Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Tile number | 0 | 1 | 5 | 4 | 8 | 12 | 13 | 9 | 10 | 14 | 15 | 11 | 7 | 6 | 2 | 3 |
| Processor | | | | | A | | B | | | | | | C | | | |
| Free slots ahead | | | | | 0 | | 3 | | | | | | 3 | | | |

When processor A completes its current tile, then it cannot simply be assigned the next slot in the sequence (as that tile is already completed). Instead, a free tile is chosen from one of the other free regions.

In order to try to give processor A a significant amount of work before it next encounters an already processed tile, the slot (tile) at the end of a free region is not allocated to processor A. Similarly, to try to avoid processor A "getting in the way" of another processor by choosing that processor's next free slot, the first free slot in the region is not allocated to processor A either.

Instead, in this embodiment, the next processor with free slots ahead of it is found, and the middlemost free slot from that group chosen as the slot to allocate to processor A. The index and free slots for processor A are then updated, as are the free slots for the processor that processor A is "stealing" its new tiles from.

Assuming processor A is "stealing" from processor B, this can be done as follows:

$S_A = S_B + (F_B + 1)/2$ $F_A = S_B + F_B - S_A$ $F_B = S_A - S_B - 1$

Where $S_A$ and $S_B$ are the sequence indices for processor A and B respectively, and $F_A$ and $F_B$ are the free slot counts. Integer division is used, so that it rounds down. This is particularly useful for hardware implementation since it can be implemented easily by shifting the bits one place to the right.

Applying this rule to the current state of the system gives:

$S_A = S_B + (F_B + 1)/2 = 6 + (3+1)/2 = 8$ $F_A = S_B + F_B - S_A = 6 + 3 - 8 = 1$ $F_B = S_A - S_B - 1 = 8 - 6 - 1 = 1$

So:

A completes
New sequence index 8
Tile 10

| $0_A$ | $1_A$ | 2 | 3 |
|---|---|---|---|
| $4_A$ | $5_A$ | 6 | $7_C$ |
| $8_A$ | 9 | $10_A$ | $11_C$ |
| $12_B$ | $13_B$ | 14 | $15_C$ |

| Proc | Seq. | Free |
|---|---|---|
| A | 8 | 1 |
| B | 6 | 1 |
| C | 12 | 3 |

The processing continues in this vein until there are no free slots left, at which point the processors halt.

C completes
New sequence index 13
Tile 6

| $0_A$ | $1_A$ | 2 | 3 |
|---|---|---|---|
| $4_A$ | $5_A$ | $6_C$ | $7_C$ |
| $8_A$ | 9 | $10_A$ | $11_C$ |
| $12_B$ | $13_B$ | 14 | $15_C$ |

| Proc | Seq. | Free |
|---|---|---|
| A | 8 | 1 |
| B | 6 | 1 |
| C | 13 | 2 |

B completes
New sequence index 7
Tile 9

| $0_A$ | $1_A$ | 2 | 3 |
|---|---|---|---|
| $4_A$ | $5_A$ | $6_C$ | $7_C$ |
| $8_A$ | $9_B$ | $10_A$ | $11_C$ |
| $12_B$ | $13_B$ | 14 | $15_C$ |

| Proc | Seq. | Free |
|---|---|---|
| A | 8 | 1 |
| B | 7 | 0 |
| C | 13 | 2 |

A completes
New sequence index 9
Tile 14

| $0_A$ | $1_A$ | 2 | 3 |
|---|---|---|---|
| $4_A$ | $5_A$ | $6_C$ | $7_C$ |
| $8_A$ | $9_B$ | $10_A$ | $11_C$ |
| $12_B$ | $13_B$ | $14_A$ | $15_C$ |

| Proc | Seq. | Free |
|---|---|---|
| A | 9 | 0 |
| B | 7 | 0 |
| C | 13 | 2 |

B completes
New sequence index 14
Tile 2
Steals from C

| $0_A$ | $1_A$ | $2_B$ | 3 |
|---|---|---|---|
| $4_A$ | $5_A$ | $6_C$ | $7_C$ |
| $8_A$ | $9_B$ | $10_A$ | $11_C$ |
| $12_B$ | $13_B$ | $14_A$ | $15_C$ |

| Proc | Seq. | Free |
|---|---|---|
| A | 9 | 0 |
| B | 14 | 1 |
| C | 13 | 0 |

$S_B = S_C + (F_C+1)/2 = 13 + (2+1)/2 = 14$ $F_B = S_C + F_C - S_B = 13 + 2 - 14 = 1$ $F_C = S_B - S_C - 1 = 14 - 13 - 1 = 0$

C completes
New sequence index 15
Tile 3
Steals from B

| $0_A$ | $1_A$ | $2_B$ | $3_C$ |
|---|---|---|---|
| $4_A$ | $5_A$ | $6_C$ | $7_C$ |
| $8_A$ | $9_B$ | $10_A$ | $11_C$ |
| $12_B$ | $13_B$ | $14_A$ | $15_C$ |

| Proc | Seq. | Free |
|---|---|---|
| A | 9 | 0 |
| B | 14 | 0 |
| C | 15 | 0 |

$S_C = S_B + (F_B+1)/2 = 14 + (1+1)/2 = 15$ $F_C = S_B + F_B - S_C = 14 + 1 - 15 = 0$ $F_B = S_C - S_B - 1 = 15 - 14 - 1 = 0$

| Sequence Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Tile number | 0 | 1 | 5 | 4 | 8 | 12 | 13 | 9 | 10 | 14 | 15 | 11 | 7 | 6 | 2 | 3 |
| Processor | | | | | | | B | | A | | | | C | | | |
| Free slots ahead | | | | | | | 1 | | 1 | | | | 3 | | | |

At this point, there are no free slots left, so the processors halt as they complete these final tiles. When all processors have halted, the job is finished.

This embodiment requires only two integer values per processor (the current order index (representing the current tile) and the number of free slots (tiles) ahead of the processor along its in path (in the order)), each capable of representing a number up to n−1. The update complexity in the simple case is O(1) and for the stealing case is typically also O(1) if the next processor has free slots, or O(m) if not. This makes it very cheap in memory and time.

The table that translates path sequence indices in this embodiment to tile indices can either be set up explicitly in memory, or in certain regular cases can be made implicit (e.g. for Morton ordering when the output is of the form 2x *2y tiles, when x and y do not differ by more than one, then the tile index is a simple bit interleave of the sequence index). In general, the sequence table may be set up at some time after the time when the dimensions of the output tile array (frame) are determined, and before the start of rendering. This may be done, e.g., by the device driver.

The preceding description assumes that the processors are independent. In a multiprocessor system, there may instead be clusters of dependent processors. For example, a cluster of 4 processors may all share a common L1 cache. In this case, it is advantageous to keep the accesses within each cluster as close as possible, because data required by one processor may already have been pulled into the cluster's cache by another.

In this case, in an embodiment the list of tiles (the tile traversal path) is associated with each cluster, and as each processor within the cluster becomes free, it is allocated the next available tile from its own cluster's list. This then applies the allocate-as-you-go strategy to each cluster of processors. Even though there may be several active processors for each list, the lists can be managed in exactly the same way as before.

For multiple levels of clustering (e.g. where there are clusters of clusters) then cache coherence per cluster can be maximised by assigning the start positions of the traversal lists recursively inside the image. This works particularly well for symmetrical, closed, space-filling traversal paths such as Peano ordering, where the start points for each cluster can be assigned at regular intervals along the traversal path.

For HD rendering, with explicitly managed lists, to reduce the overhead of the data structures if required, the tile lists (tile traversal paths) can be modified so that each element (i.e. tile) in the list (path) represents a group of individual "rendering" tiles (e.g. a 2×2 block of rendering tiles). In this case, the clustered case can be simplified by making the list "element" size the same as the size of the cluster (the same size as the number of processors in the cluster), so that one processor in the cluster can be assigned to each rendering tile in the list "element", with the "cluster" only being moved on to its next list "element" when all the "rendering" tiles of the current list element have been completed.

It can be seen from the above that the technology described herein, in its embodiments at least, has the effect of partitioning the set of tiles to be processed in such a way that different rendering processors will start working on their own local areas of the output frame (thereby maintaining spatial coherence), but then can progress towards and into other processors' starting areas if those processors are taking longer to process their blocks, thereby facilitating load-balancing and ensuring that all the processors substantially remain busy until all the output is processed.

This is achieved, in the embodiments of the technology described herein at least, by defining respective tile traversal paths for each rendering processor that start at a tile initially allocated to the processor and that, at least for the initial tiles along the path, traverse to spatially adjacent tiles in the output and that will traverse every tile to be rendered if followed to their end. The next tile for a given rendering processor to process is then selected as being the next tile along its defined path, unless the next tile in the path has already been processed (or is already being processed) by another rendering processor, in which case the next tile to be allocated to the rendering processor is selected to be a free tile further on in the tile traversal path for that processor.

The foregoing detailed description of the technology described herein has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical application, to thereby enable others skilled in the art to best utilise the technology described herein in various embodiments and with various modifications as are suited to the particular use contemplated. It is intended that the scope of the technology described herein be defined by the claims appended hereto.

What is claimed is:

1. A method of generating an output array of data comprising a plurality of blocks of data in a data processing system that comprises plural data block generating processors, the method comprising:
  initially allocating a different data block of the plurality of data blocks to be generated to each data block generating processor; and
  when each processor completes the data block it is currently processing, allocating another data block that is still to be processed to that processor, and so on, until all the data blocks to be generated have been allocated to processors;
  wherein the next data block to be allocated to a given processor for processing is selected as being the next data block along a path defined for that given processor that starts at the data block initially allocated to that processor and that will traverse every data block to be generated if followed to its end, and which path is configured such that, at least for the initial data blocks along the path, adjacent data blocks in the path are spatially adjacent in the output array of data, unless the next data block in the path for the given processor has already been allocated to another processor, in which case the next data block to be allocated to the given processor is selected to be a data block further on in the data block traversal path for that given processor that is still to be allocated to a processor for processing.

2. The method of claim 1, wherein the data block allocation path for each processor is configured so as to try to maintain spatial coherency.

3. The method of claim 1, wherein there is a single, common, data block traversal order shared by the data block allocation paths for all the processors, and the data block allocation paths for each processor are made different from each other by each starting at a different data block within that common data block traversal order.

4. The method of claim 1, further comprising, if the next data block in the path for the given processor has already been allocated to another processor, selecting the next data block to be allocated to the processor by identifying the next run of still to be allocated data blocks along the path for that processor and then selecting a data block from partway along that run of data blocks as the data block for the processor to process.

5. The method of claim 1, further comprising maintaining for each processor a record of the data block that the processor is currently processing and of the number of still to be allocated data blocks ahead of that data block along the processor's path until a data block that has already been allocated to another processor will be reached.

6. The method of claim 1, wherein each processor that has a path defined for it and data blocks allocated to it comprises a cluster of plural individual processors that are dependent on each other and/or that share a cache.

7. The method of claim 1, wherein the data processing system comprises a tile-based graphics processing system, the data block generating processors comprise respective rendering processors of the graphics processing system, and the output array of data being generated comprises all or part of an output render target to be generated by the graphics processing system.

8. The method of claim 7, wherein each data block to be allocated to a given processor for processing comprises a single rendering tile of the output render target.

9. The method of claim 7, wherein each data block to be allocated to a given processor for processing comprises plural rendering tiles of the output render target.

10. The method of claim 1, further comprising:
allocating the blocks of data to be processed for an output data array to the plural data processors in such a way that each processor will initially receive a sequence of blocks for processing from a particular region of the output data array, and then receive blocks for processing from a region of the output data array initially allocated to another data processor, until all the blocks for the output have been allocated for processing.

11. A data processing system comprising:
a plurality of processors for generating output blocks of data representing particular regions of an output array of data to be provided by the data processing system; and
a data block allocator for allocating data blocks to be generated to produce an output array of data to the plural processors; wherein the data block allocator is configured to:
initially allocate a different data block of the data blocks to be generated to each data block generating processor; and to,
when a processor completes the data block it is currently processing, allocate another data block that is still to be processed to that processor, and so on, until all the data blocks to be generated have been allocated to processors; and
wherein the data block allocator is configured to:
select the next data block to be allocated to a given processor for processing as being the next data block along a path defined for that given processor that starts at the data block initially allocated to that processor and that will traverse every data block to be generated if followed to its end, and which path is configured such that, at least for the initial data blocks along the path, adjacent data blocks in the path are spatially adjacent in the output data array, unless the next data block in the path for the given processor has already been allocated to another processor, in which case it selects a data block further on in the data block traversal path for the given processor that is still to be allocated to a processor for processing as the next data block to be allocated to the given processor for processing.

12. The system of claim 11, wherein the data block allocation path for each processor is configured so as to try to maintain spatial coherency.

13. The system of claim 11, wherein there is a single, common, data block traversal order shared by the data block allocation paths for all the processors, and the data block allocation paths for each processor are made different from each other by each starting at a different data block within that common data block traversal order.

14. The system of claim 11, wherein the data block allocator is further configured to, if the next data block in the path for the given processor has already been allocated to another processor, select the next data block to be allocated to the processor by identifying the next run of still to be allocated data blocks along the path for that processor and then select a data block from partway along that run of data blocks as the data block for the processor to process.

15. The system of claim 11, wherein the data block allocator is further configured to maintain for each processor a record of the data block that the processor is currently processing and of the number of still to be allocated data blocks ahead of that data block along the processor's path until a data block that has already been allocated to another processor will be reached.

16. The system of claim 11, wherein each processor that has a path defined for it and data blocks allocated to it comprises a cluster of plural individual processors that are dependent on each other and/or that share a cache.

17. The system of claim 11, wherein the data processing system comprises a tile-based graphics processing system, the data block generating processors comprise respective rendering processors of the graphics processing system, and the output array of data being generated comprises all or part of an output render target to be generated by the graphics processing system.

18. The system of claim 17, wherein each data block to be allocated to a given processor for processing comprises a single rendering tile of the output render target.

19. The system of claim 17, wherein each data block to be allocated to a given processor for processing comprises plural rendering tiles of the output render target.

20. A data block allocation apparatus for use in a data processing system in which an output array of data is generated by the data processing system generating blocks of data representing particular regions of the output array of data and which comprises plural data block generating processors, the data block allocation apparatus comprising processing circuitry configured to:
initially allocate a different data block of a set of data blocks to be generated to produce an output array of data to each data block generating processor of a set of plural data block generating processors of a data processing system; and
when a processor completes the data block it is currently processing, allocate another data block that is still to be processed to that processor, and so on, until all the data blocks to be generated have been allocated to processors;
wherein the processing circuitry configured to, when a processor completes the data block it is currently processing, allocate another data block that is still to be processed to that processor is configured to:
select the next data block to be allocated to a given processor for processing as being the next data block along a path defined for that processor that starts at the data block initially allocated to that processor and that will traverse every data block to be generated if followed to its end, and which path is configured such that, at least for the initial data blocks along the path, adjacent data blocks in the path are spatially adjacent in the output data array, unless the next data block in the path for the given processor has already been allocated to another processor, in which case it selects a data block further on in the data block traversal path for the given processor that is still to be allocated to a processor for processing as the next data block to be allocated to the given processor for processing.

21. A data processing system comprising:
a plurality of data processors each operable to generate output blocks of an output data array to be generated by the data processing system; and
a data block allocator for allocating blocks of data for processing to the data processors of the data processing system and configured to allocate the blocks of data to be processed for an output data array to the plural data processors in such a way that each processor will initially receive a sequence of blocks for processing from a particular region of the output data array, and then receive blocks for processing from a region of the output data array initially allocated to another data processor, until all the blocks for the output have been allocated for processing.

22. A non-transitory computer readable medium storing computer software code which when executing on one or more processors performs a method of generating an output array of data comprising a plurality of blocks of data in a data processing system that comprises plural data block generating processors, the method comprising:
initially allocating a different data block of the plurality of data blocks to be generated to each data block generating processor; and
when each processor completes the data block it is currently processing, allocating another data block that is still to be processed to that processor, and so on, until all the data blocks to be generated have been allocated to processors;
wherein the next data block to be allocated to a given processor for processing is selected as being the next data block along a path defined for that given processor that starts at the data block initially allocated to that processor and that will traverse every data block to be generated if followed to its end, and which path is configured such that, at least for the initial data blocks along the path, adjacent data blocks in the path are spatially adjacent in the output array of data, unless the next data block in the path for the given processor has already been allocated to another processor, in which case the next data block to be allocated to the given processor is selected to be a data block further on in the data block traversal path for that given processor that is still to be allocated to a processor for processing.

* * * * *